(12) United States Patent
Valletta

(10) Patent No.: US 6,970,105 B2
(45) Date of Patent: Nov. 29, 2005

(54) PASSENGER CONTROL SYSTEM DURING A PLANE FLYING

(76) Inventor: Paolo Valletta, Via Lulli 2, 04100, Latina (IT)

( * ) Notice: Subject to any disclaimer, the term of this patent is extended or adjusted under 35 U.S.C. 154(b) by 1 day.

(21) Appl. No.: 10/425,269

(22) Filed: Apr. 29, 2003

(65) Prior Publication Data

US 2004/0095246 A1    May 20, 2004

(30) Foreign Application Priority Data

Nov. 14, 2002   (IT) ............................... LT02A0018

(51) Int. Cl.[7] ........................... G08B 21/00; G08B 1/08
(52) U.S. Cl. ................ 340/945; 340/539.12; 340/5.52; 340/5.82; 244/1 R; 701/3; 701/14
(58) Field of Search ........................... 340/945, 539.1, 340/539.11, 539.12, 539.25, 5.52, 5.82; 701/3, 701/14; 244/1 R

(56) References Cited

U.S. PATENT DOCUMENTS 6,696,928 B1 * 2/2004 Boveja et al. ......... 340/426.12

| | | | | |
|---|---|---|---|---|
| 2003/0090382 A1 * | 5/2003 | Shear | ......................... | 340/574 |
| 2003/0169173 A1 * | 9/2003 | Longere | ..................... | 340/576 |
| 2004/0021581 A1 * | 2/2004 | Weigl | ......................... | 340/945 |
| 2004/0027256 A1 * | 2/2004 | Lane | ......................... | 340/945 |

* cited by examiner

*Primary Examiner*—Donnie L. Crosland
(74) *Attorney, Agent, or Firm*—Bucknam and Archer

(57) ABSTRACT

A passenger control system during a plane flying is disclosed, which is adapted to keep under checking all the passengers, so as to prevent and in case avoid any action such as hijackments, attempts etc. The system includes a plurality of interactive communicating units (9, 10) adapted to communicate reciprocally, of which each first unit (9) is made by an arm-band or collar (11) supported by each passenger and having an individual code to identify the related passenger, and each second unit (10) is made like a remote unit available by the plane personnel and adapted to store the codes of all the passengers and to recognize them. The system is designed in a manner that the emotional conditions of the passengers are detected and, in case of change of such conditions, the plane personnel is informed so as to intervene promptly on the related passenger.

6 Claims, 4 Drawing Sheets

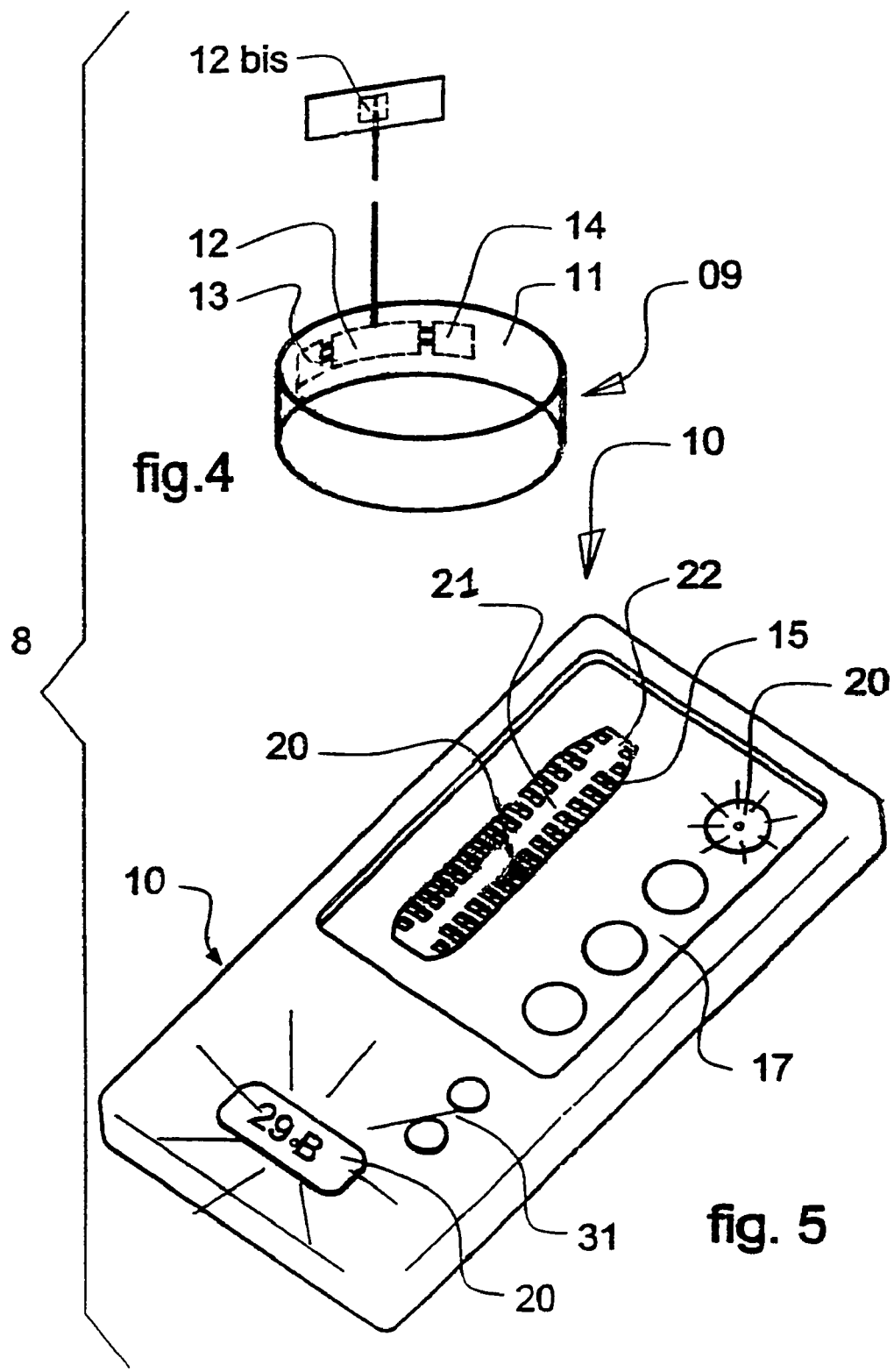

ized with to the emotional condition changes, then, through the detector 12 of such emotional condition change—

PASSENGER CONTROL SYSTEM DURING A PLANE FLYING

BACKGROUND OF THE INVENTION

The invention relates to a control system adapted to keep under checking the passengers on a flying plane, so as to prevent and in the case avoid any action such as hijackments, attempts, etc.

Anyone who is a passenger on a flying plane at the present time, has certainly questioned if that flight occurs at safe conditions or not, and by looking at the passengers of the same plane try to understand if among them there is some evil minded person. Unfortunately, the current state of the art of the plane safety systems still providing many outboard checkings, also sophisticated, does not provide direct checkings on the persons on board and such checkings are relied upon the plane skilled personnel to intervene on the evil minded persons when the facts are degenerating, so as to neutralize such persons.

SUMMARY OF THE INVENTION

Therefore, the object of the invention is to provide for a simple and reliable system adapted to prevent such dangerous states by signaling any possible change of the emotional condition of one or more passengers, by individuating also the position thereof, so as to prevent any dangerous action thereof and in case of need to intervene on the same passenger (s) with adequate means to resolve the critical situation.

Everybody knows that who intends to perform a negative action, before being perceived from the other, has a change of the emotional condition, an excessive production of adrenalin, an increase of sweat, an increase of the cardiac throbs etc. ., so that by perceiving in advance such changing condition there is the possibility to intervene with some preventive direct actions, such as the actions devoted to isolate the person, or some indirect actions such as the actions devoted to lower the flying plane cruising height, at such a level in which the pressurization isn't more requested, to alert the airport traffic control tower of this dangerous situation, to close any plane armoured door etc. . In the case in which the dangerous situation persists, the system referred to can deliver to the evil minded person a substance like a narcotic or a strong tranquilizer adapted to neutralize the offensive capability thereof. The system hereinafter described more in detail provides for a receiver-transmitter unit to be carried for example by the person wrist, which is associated with a cardiac throbs detector and in case also with a system for micro injecting or transferring the substance on the person pelvis.

Such receiver-transmitter units are associated with control units of fixed or palmar type which are available by the flight safety personnel, and allow to identify the passenger code and to individuate the passenger position.

BRIEF DESCRIPTION OF THE DRAWINGS

These and other characteristics of the present invention will be better understood from the following description, given by way of a not limiting example only and with reference to the accompanying drawings, wherein:

FIG. 4 shows a receiver-transmitter unit as from the block diagram of FIG. 1, FIG. 5 shows a possible embodiment of the detecting screen available by the flight personnel, below which is arranged the remote receiver-transmitter unit as from the diagram of FIGS. 3 and 4.

DETAILED DESCRIPTION OF THE INVENTION

The present invention here described relates to a system 8 (see FIGS. 4 and 5) constituted by a plurality of interactive communicating units 9 and 10, adapted to communicate reciprocally, of which the supported unit 9 is housed into an arm-band or collar (see FIG. 4) to be worn before going into the plane. As indicated in the described embodiment, this arm-band or collar may be made of soft or rigid material and also of fabric, and not removable anyway from this position.

Figure 1:
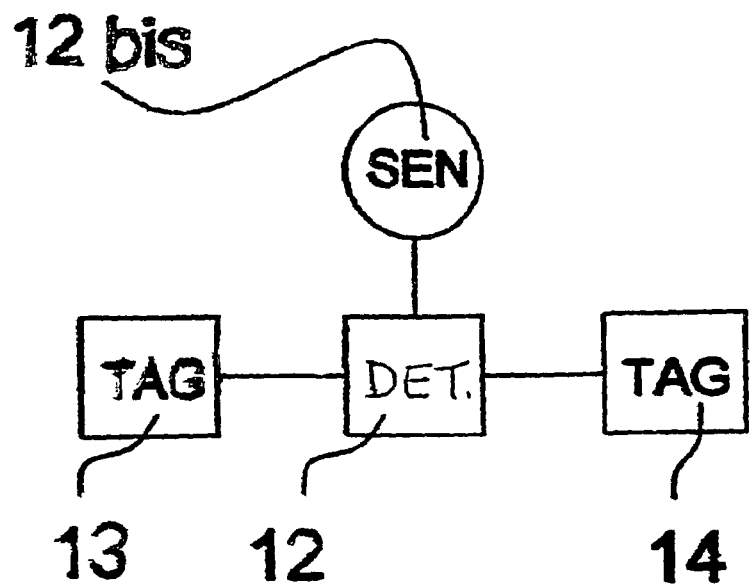
FIG. 1 shows the block diagram of all the components of the electronic receiver-transmitter detecting unit, normally arranged on the passenger, which can be also provided with optional components, not indicated herein.

When the passenger goes into the plane, he passes between two detecting antennas of the plane (not illustrated), which identify instantaneously the code of the unit 9 worn by him and store such code as active code on the remote units 10, which are available by the plane personnel, and which are set to zero when the flight is ended, so as to make it available to store the codes of new passengers of the subsequent flight. Since two codes for each passenger are available for the reasons set forth below, namely a code is even, for example the first code, and the other code is uneven, for example the second code, when reading a complete code of the passenger composed of such two codes, according to this logic a complete code will be stored and displayed on the corresponding remote unit 10. Obviously, also other code identifying systems such that with different signs or sequences of letters could be employed, thus without departing from the protection sphere of the present invention. Such supported unit 9 is constituted by a band 11 for example made of fabric with two layers, which can be closed with an elastic or self adhering element, and said layers can include an electrical connection therein, composed of a detector 12 of the emotional condition change, attached to a sensor 12 bis (see also FIG. 1) into contact with the skin, and of two receiver-transmitter units 13 and 14 preferably of the type TAG or the like, said detector 12 being formed by way of not limiting example by a cardiac throbs counter and being interfaced with the two adjacent receiver-transmitter units 13 and 14, which latter are structurally identical to the normally known TAG units, but are able to activate themselves only under control of the detector 12 being activated.

Figure 6:
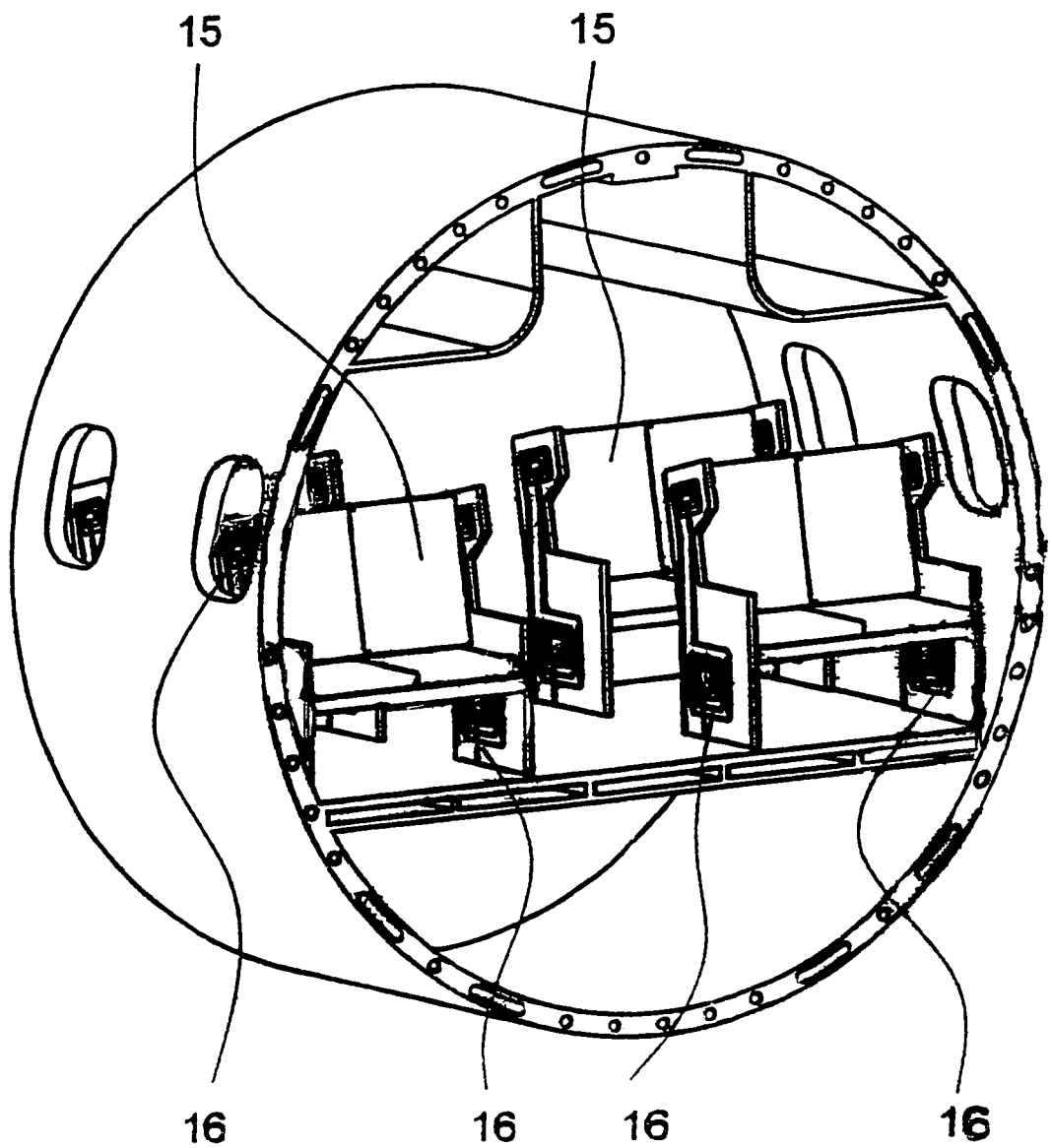
FIG. 6 shows a possible embodiment of a plane cross-section provided with antennas to detect the position of the passenger being checked as from the diagram of FIG. 3.

For example, the unit 13 will be activated under normal emotional conditions while the unit 14, on the contrary, will be activated only in case of anomalous emotional conditions, by releasing an alarm signal which will be displayed on the screen 20 of the related remote unit 10 (see FIG. 5). In fact, since the sensor 12 bis is located on a point sensito the heart pulsations and blood pressure like the finger tip, the wrist or the jugular veins, it will detect the cardiac throbs frequency and the inner blood pressure namely the person emotional condition. In this way, if the cardiac throbs decrease below a certain threshold, for example of 15 cardiac throbs, this would mean that the passenger feels sick and therefore needs to be helped or that he has removed the arm-band and therefore needs to be checked. On the contrary, if the cardiac throbs increase over a certain threshold, for example of 120 cardiac throbs, this would mean that in this case the person is altered and therefore needs to be inspected. These emotional conditions detection is perceived by antennas 16 placed on sides of the plane seats 15 (see FIG. 6), which antennas are normally provided as TAG detectors, and set to transmit an excitation signal to them and to receive the response signals therefrom, which signals are composed of the codes of the various passengers so as to identify the relative positions thereof. In this way, when on the display panel 17 of the remote receiver unit 10 (see FIG. 5), which reproduces stylistically the plane passenger compartment, will appear an alarm code, the position of the passenger referred to will be immediately detected, so that this passenger can be immediately inspected by the safety plane personnel and, in case in which this intervention of this personnel would not be sufficient, also the plane pilots as main responsible persons of the passenger safety could intervene. The remote receiver unit 10 can be also connected directly to the antennas 16, thus without departing from the protection sphere of the present invention.

Figure 2:
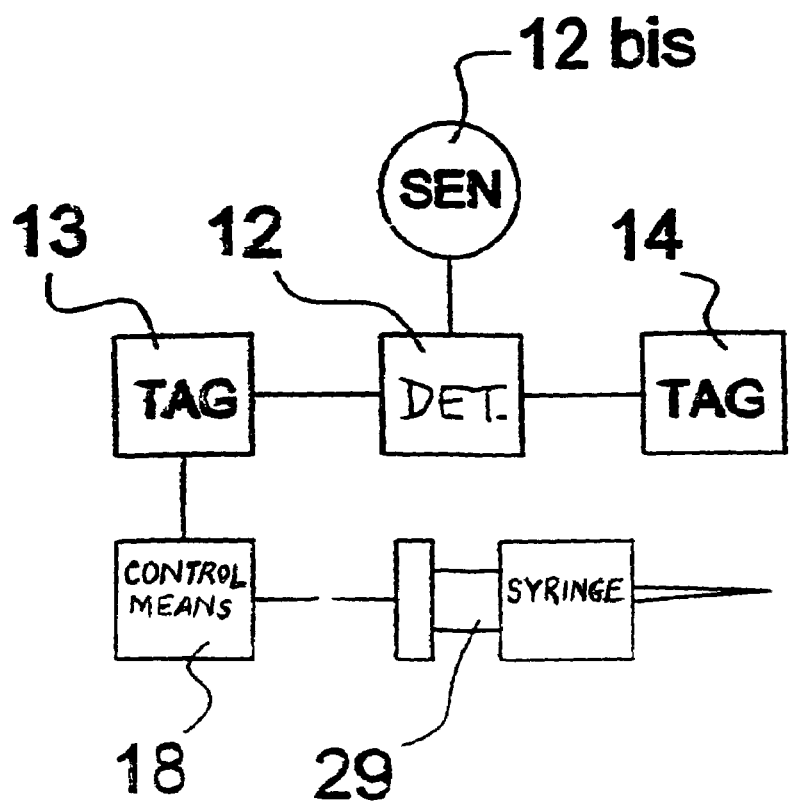
FIG. 2 shows the block diagram of all the components of the receiver-transmitter unit of FIG. 1, provided also with a system for delivering sedative medicaments, which can be also provided with optional components, indicated therein.
Figure 3:
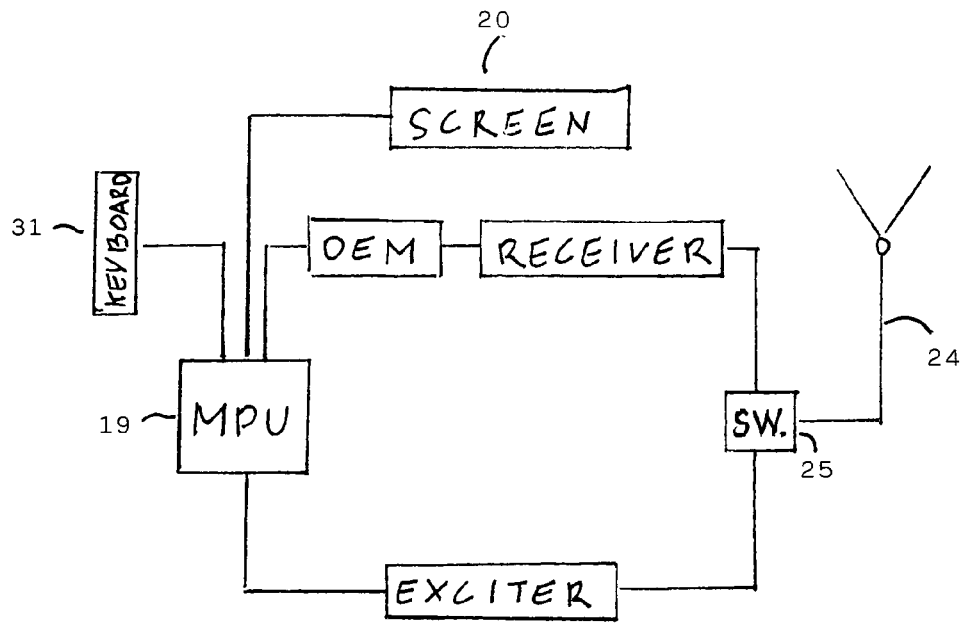
FIGS. 3 and 3A shows the block diagram of all the components of the remote interface electronic receiver-transmitter unit available by the flight safety personnel, which can be also provided with optional components, not indicated therein.
Figure 3A:
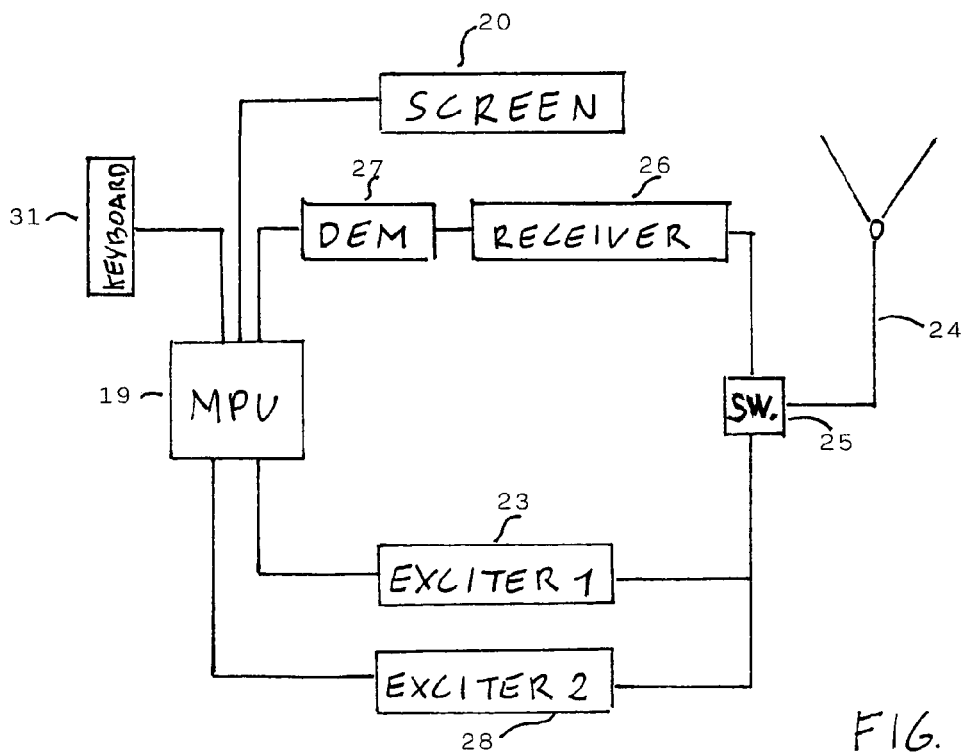

The arm-band 9 may also include a control means 18 controlled solely by the remote control unit 10 available by the safety personnel and the pilots (see FIG. 2), which means acts on a delivering system 29 such a syringe, to inject or deliver by pelvic contact a micro dose of sedatives, narcotics or strong tranquilizers to the dangerous passenger, so as to reduce or neutralize the offensive capability of this passenger. Turning now to FIGS. 3 and 3a, illustrating the remote control unit 10, such unit is composed of a control unit 19, which can be made of the MPU type adequately adapted, and a screen 20 connected to the unit 19, onto which the passenger compartment, the seats 15 and the corridors (not shown) are perfectly reproduced. This control unit 19 is also connected to a keyboard 31 (see FIGS. 3 and 3A) to set the related data, and to one exciter 23 (see FIG. 3) or another exciter 28 (see FIG. 3A), adapted to emit sequentially, through the electronic switch 25 and the antenna 24 also connected to the exciter (s) and the unit 19 referred to, to the various TAG units the signals with all the even and uneven codes of the same TAG units of the passengers on board.

In turn, the related TAG units when receiving these signals will be activated and provide a related response signal, but only the TAG unit 13 or 14 enabled by the sensor 12 bis detecting the emotional condition change will respond, and the response signal thereof will be received by the antenna 24 and supplied through the electronic switch 25 to the receiver unit 26 and the demodulator unit 27, which are also connected in the electric circuit of the electric components referred to, and in turn this demodulator unit 27 will provide to convert this signal into a coded signal which can be deciphered and identified by the MPU control unit 19, and this latter by recognizing the code of the altered passenger will indicate on the display panel 17 the person referred to and his position, by lighting up the related screen 20 (see FIG. 5) or by activating any other possible signalling means.

What is claimed is:

1. Passenger control system during a plane flying, adapted to keep passengers under check so as to prevent and in case avoid any action including hijackings, the plane comprising a plane passenger compartment with plane seats (15), wherein the control system includes a plurality of first and second interactive communicating units (9, 10) adapted to communicate reciprocally, each first unit (9) being housed in an arm-band or collar (11) worn by each passenger before going into the plane and each second unit (10) being a remote unit available to plane personnel, each said first unit (9) having an individual code to identify the passenger wearing the arm-band or collar, which is identified by two detecting antennas on the plane, when the passenger goes into the plane and is stored as active code in said second remote unit (10), with all the codes of all the passengers, so as to recognize the passengers, and said second remote unit (10) being set to zero when the flight is ended, so as to make said second remote unit available to store the codes of new passengers of a subsequent flight, said first unit (9) being formed by at least a detector (12) of an emotional condition change, attached to a sensor (12 bis) in contact with the person's skin and sensitive to normal and anomalous emotional conditions, and being also formed by two receiver-transmitter units (13, 14), connected to said detector (12) and said sensor (12 bis), of which the first receiver-transmitter unit (13) is activated by the person's normal emotional conditions and the second receiver-transmitter unit (14) is activated only by the person's anomalous emotional conditions, by releasing an alarm signal with the code of the passenger; said second unit (10) being formed by an electric circuit including control unit (19), display unit (20), exciter unit (23, 28), an electronic switch (25) connected to an antenna (24), a receiver unit (26), a demodulator unit (27) and a keyboard (31) to set related data; said exciter unit (23, 28) being adapted to emit sequentially, through said electronic switch (25) and said antenna (24), a plurality of signals with all the stored codes of all the passengers, which signals are received by the various first and second receiver-transmitter units (13, 14) of said first unit (9), through related antennas (16) placed on the plane seats (11) and associated with the corresponding detectors (12), and wherein receiver-transmitter units (13, 14) when receiving the emitted signals being activated to provide a related response signal and enabled to transmit a response signal to said control unit (19), through said antennas (16, 24), only when the sensor (12 bis) sensing the anomalous emotional condition of the passenger(s) are activated, in a manner that this response signal provides for recognizing the person referred to and his position, and indicating this situation onto said display unit (20).

2. Passenger control system according to claim 1, wherein said detector (12) is formed by a cardiac throbs counter.

3. Passenger control system according to claim 2, wherein said sensor (12 bis) is located on a point sensitive to the heart pulsations and blood pressure including a finger tip, a wrist or jugular veins and set to indicate if cardiac throb frequency and blood pressure decreases below or increases over a pre-established threshold, in the respective conditions in which the passenger feels sick and needs to be helped, or has removed said arm-band or collar (11) and needs to be checked, and in which the passenger is altered and needs to be inspected.

4. Passenger control system according to claim 3, wherein said remote control unit (10) includes a display panel (17) reproducing stylistically the plane passenger compartment with all the seat positions.

5. Passenger control system according to claim 3, wherein said remote control unit (10) can be also connected directly to said antennas (16).

6. Passenger control system according to claim 5, wherein said receiver-transmitter units (13, 14) are also connected to control unit (18) controlled by said remote control unit (10) and associated with a delivering system (29) such a syringe, to inject or deliver a micro dose of sedatives, narcotics or strong tranquilizers to the person under an anomalous emotional condition, sensed by said sensor means (12 bis).

* * * * *